US012674938B2

(12) United States Patent
Luetz et al.

(10) Patent No.: US 12,674,938 B2
(45) Date of Patent: Jul. 7, 2026

(54) WAVE FRONT MANIPULATOR WITH DIFFRACTIVE COMPONENTS

(71) Applicant: Carl Zeiss Jena GmbH, Jena (DE)

(72) Inventors: Andreas Luetz, Dornburg-Camburg (DE); Matthias Hillenbrand, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 785 days.

(21) Appl. No.: 17/768,466

(22) PCT Filed: Oct. 8, 2020

(86) PCT No.: PCT/EP2020/078309
§ 371 (c)(1),
(2) Date: Apr. 12, 2022

(87) PCT Pub. No.: WO2021/074011
PCT Pub. Date: Apr. 22, 2021

(65) Prior Publication Data
US 2024/0295702 A1      Sep. 5, 2024

(30) Foreign Application Priority Data
Oct. 14, 2019     (DE) .......................... 102019127590.3

(51) Int. Cl.
*G02B 6/34*          (2006.01)
*G03B 17/17*        (2021.01)
(52) U.S. Cl.
CPC .............. *G02B 6/34* (2013.01); *G03B 17/17* (2013.01)
(58) Field of Classification Search
CPC ................................. G02B 6/34; G03B 17/17

USPC ............................................................. 359/34
See application file for complete search history.

(56) References Cited

U.S. PATENT DOCUMENTS

| | | | |
|---|---|---|---|
| 3,305,294 A | 2/1967 | Alvarez | |
| 4,307,929 A | * 12/1981 | Eveleth ...................... | G02F 1/33 |
| | | | 359/311 |
| 4,455,061 A | * 6/1984 | Case ......................... | G03H 1/26 |
| | | | 359/22 |
| 6,128,109 A | * 10/2000 | Jenkins ............... | G11C 13/042 |
| 10,114,223 B2 | 10/2018 | Rudolph et al. | |

(Continued)

FOREIGN PATENT DOCUMENTS

| DE | 102011055777 A1 | 5/2013 |
|---|---|---|
| WO | 2016118918 A1 | 7/2016 |

OTHER PUBLICATIONS

I.M. Barton, et al.; "Diffractive Alvarez Lens"; Optics Letters 2000 (25), pp. 1-3; Jan. 1, 2000; 3 pages.

(Continued)

*Primary Examiner* — Sharrief I Broome
(74) *Attorney, Agent, or Firm* — Skaar Ulbrich Macari, P.A.

(57) ABSTRACT

A wave front manipulator can include an optical axis and at least two diffractive optical components, which are arranged successively along the optical axis. The diffractive optical components each can include a diffractive structure having a number of diffractive holographic structural elements. The wave front manipulator is designed to vary a wave front between at least two different states via the diffractive structures of the at least two diffractive optical components.

24 Claims, 11 Drawing Sheets

(56)                  References Cited

U.S. PATENT DOCUMENTS

| | | | |
|---|---|---|---|
| 2003/0076556 A1* | 4/2003 | VanWiggeren | G02F 1/29 |
| | | | 359/3 |
| 2019/0107719 A1* | 4/2019 | Edwin | G09G 3/003 |
| 2019/0187465 A1 | 6/2019 | Erler et al. | |
| 2020/0183079 A1 | 6/2020 | Leister | |
| 2020/0183329 A1* | 6/2020 | Lee | G03H 1/28 |
| 2022/0196896 A1* | 6/2022 | Werdehausen | G02B 5/1809 |

OTHER PUBLICATIONS

A. Grewe, et al., Opto-mechanische Mikrosysteme zur hyperspektralen Bildgebung (Opto-mechanical Microsystems for Hyperspectral Imaging Sensors), Mikrosystemtechnik Kongress 2013, Oct. 14-16, 2013, 2 pages.

Sutherland, R.L., et al., "Switchable holograms in new photopolymer-liquid crystal composite materials", SPIE: Diffractive an 30 Holographic Optics Technology, 2404: 132-143, Feb. 9-10, 1995, 12 pages.

Sutherland, R.L., et al., "Electrically switchable volume gratings in polymer-dispersed liquid crystals"; Appl. Phys. Lett., 64(9): 1074-1076, Feb. 28, 1994, 4 pages.

Shane Colburn, et al., "Varifocal zoom imaging with large area focal length adjustable metalenses", arxiv.org, Cornell Univeristy Library, 201 Olin Library Cornell University Ithaca, NY 14853, (May 21, 2018), doi:10.1364/OPTICA.5.000825, XP081139706, May 21, 2018, 27 pages.

Bawart M., et al., "Remote focusing in confocal microscopy by means of a modified Alvarez lens", Journal of Microscopy, vol. 271, No. 3, doi: 10.1111/jmi. 12724, ISSN 0022-2720, (Sep. 22, 2018), pp. 337-344, URL: https://onlinelibrary.wiley.com/doi/full-XML/10.1111/jmi. 12724, XP055775216, Sep. 22, 2018, 8 pages.

Alexander Bielke, et al., "Design of a variable diffractive zoom lens for interferometric purposes", Optical Engineering, Soc. of Photo-Optical Instrumentation Engineers, Bellingham, vol. 56, No. 1, doi:10.1117/1.OE.56.1.014104, ISSN 0091-3286, (Jan. 1, 2017), p. 14104, (Jan. 9, 2017), XP060082428, Jan. 2017, 8 pages.

Yongchao Zou, et al., "Miniature tunable multi-element Alvarez lenses", 2014 International Conference on Optical MEMS and Nanophotonics, pp. 23-24, 2014, 2 pages.

International Search Report and Written Opinion rendered by the International Bureau of WIPO for PCT/EP2020/078309, dated Feb. 24, 2021, 10 pages.

Search Report for German Application No. 10 2019 127 590.3 rendered by the German Patent and Trade Mark Office on May 8, 2020, 14 pages (including English translation).

Office Action to the corresponding European Patent Application No. 20816088.7 rendered by the European Patent Office (EPO) on Oct. 29, 2024, 7 pages.

Office Action to the corresponding European Patent Application No. 20816088.7 rendered by the European Patent Office (EPO) on Mar. 11, 2026, 6 pages.

* cited by examiner

WAVE FRONT MANIPULATOR WITH DIFFRACTIVE COMPONENTS

PRIORITY

This application claims the benefit of German Patent Application No. 10 2019 127 590.3, filed on Oct. 14, 2019, which is hereby incorporated herein by reference in its entirety.

FIELD

The present invention relates to a wavefront manipulator with at least two diffractive optical components, which are arranged one behind the other along an optical axis, and a waveguide arrangement. Furthermore, the invention relates to the use of the wavefront manipulator and/or of the waveguide arrangement and to an optical device with a wavefront manipulator and/or a waveguide arrangement.

BACKGROUND

U.S. Pat. No. 3,305,294 by Luiz W. Alvarez describes optical elements with at least a first optical component and a second optical component, which are arranged one behind the other along an optical axis, each have a refractive free-form surface and are displaceable with respect to one another perpendicular to the optical axis. The refractive power effect of an optical element made up of the two components can be varied by lateral displacement of the optical components having the free-form surfaces. Such optical elements are therefore also called Alvarez elements or zoom lenses. A variable refractive power corresponds to a variable focal position, which is describable by a change in the parabolic component of the wavefront of a beam that is incident parallel to the axis. In this sense, a zoom lens can be viewed as a special wavefront manipulator.

In addition, I. M. Barton et al., Diffractive Alvarez Lens, Optics Letters 2000 (25), pages 1-3, discloses elements which are arranged one behind the other along an optical axis, are laterally displaceable with respect to one another in relation to the optical axis, and have diffractive surfaces. The diffractive effect of an optical element formed from the two displaceable elements depends here on the lateral position of the two elements relative to one another.

Documents U.S. Pat. No. 4,455,061 and US 2003/0076556 A1 describe holographic optical elements for beam shaping, and U.S. Pat. No. 4,455,061 describes in particular laser light in the context of a laser scanner. Document DE 10 2011 055 777 A1 discloses an optical element with at least two optical components which are arranged one behind the other along an optical axis, are movable relative to one another perpendicular to the optical axis, and have refractive and diffractive structures.

A waveguide is understood to mean a component part which comprises an inhomogeneous material which, due to its physical nature, is designed to transmit waves. An optical waveguide is designed to transmit light waves, i.e., waves having wavelengths in the range between 400 and 700 nanometers.

Document DE 10 2016 115 938 A1 describes a waveguide arrangement with a diffractive input coupling element and a diffractive output coupling element, wherein the input coupling element and/or the output coupling element can be a volume hologram. An application example of this are holographic cameras, i.e., phase-sensitive cameras, so-called HoloCams. In a HoloCam, focusing is effected in principle only on a plane that is disposed at a finite distance from a input coupling element in a waveguide or at infinity. In connection with HoloCams, it is desirable to focus the light to be diffracted into the waveguide between a plurality of planes, in the best case without any optical imaging influence on the transmitted light of other wavelengths. For example, when using an optical plane plate, especially made of window glass, a specific wavelength, for example 530 nm, should be focused and coupled in, while other wavelengths are not focused and coupled-in, so that the eye continues to look through the optical plane plate.

Refractive or reflective optical component parts are predominantly used for focusing and beam shaping. However, such component parts take up a relatively large amount of installation space and are comparatively heavy.

SUMMARY

It is an object herein to provide an advantageous wavefront manipulator that is lightweight and takes up little installation space. It is another object to provide an advantageous waveguide arrangement and an advantageous optical device. Yet another object is to specify an advantageous use for the wavefront manipulator and/or the waveguide arrangement.

The wavefront manipulator according to certain embodiments comprises an optical axis and at least two diffractive optical components, for example at least a first diffractive optical component and a second diffractive optical component. A diffractive optical component is understood to mean an optical component at which incident waves, in particular light waves, are diffracted and interference is generated in this way. The at least two diffractive optical components are arranged one behind the other along the optical axis. For example, they each comprise a plane which can extend perpendicular or at an angle of between 20 degrees and 90 degrees to the optical axis. The diffractive optical components, that is to say for example the first diffractive optical component and the second diffractive optical component, each comprise a diffractive structure with a number of diffractive holographic structure elements. In this case, the diffractive structure is preferably arranged in the plane of the respective diffractive optical component, which extends perpendicular or at an angle of between 20 degrees and 90 degrees to the optical axis. The wavefront manipulator is designed to vary a wavefront by means of the diffractive structures of the at least two diffractive optical components between at least two states that deviate from one another, in particular foci that deviate from one another.

The individual diffractive optical components can be designed as transmissive, reflective, or transflective optical components. In other words, they can develop their diffractive optical effect in transmission and/or reflection, that is to say have diffractive and transmissive optical properties at the same time and/or have diffractive and reflective optical properties at the same time.

The diffractive structure can be designed as a hologram grating, that is to say as a holographically produced grating, preferably as a volume holographic grating. The diffractive holographic structure elements can be produced by holographic recording or imaging, that is to say holographically, or they can be produced by a computer or as computer-generated holograms (CGH). A hologram is the recording or imaging of an interference pattern from two coherent radiation sources, for example light sources for visible light, in particular laser light. Volume holographic gratings are gratings implemented in the form of volume holograms. A volume hologram is a hologram which is generally produced in a light-sensitive volume material by way of exposure to two or more coherent light waves and development.

For example a focusing apparatus, for example for a holographic camera, can be implemented with the aid of the wavefront manipulator. In other words, the wavefront manipulator can be designed as a focusing apparatus, for example. Compared with focusing apparatuses that use refractive optical component parts, the wavefront manipulator has the advantage that it takes up significantly less installation space and is therefore particularly suitable for use in connection with flat optical devices, such as smartphones, HoloCams, head-up displays, smartglasses, cameras or display apparatuses, in particular projectors, or in connection with smart glass.

The wavefront manipulator is preferably designed to vary a wavefront between discrete states or continuously by means of the diffractive structures of the at least two diffractive optical components. This makes it possible, in particular, to switch between different focal planes or focal lines or focal points or to zoom. For example, the movement of the individual diffractive optical components relative to one another can take place continuously, or it is possible to switch between individual discrete states.

The wavefront manipulator can comprise at least one mechanical and/or electrical and/or acoustic device for varying, for example switching, the state of a wavefront. In other words, the wavefront can be varied by changing the diffractive properties of the wavefront manipulator overall, wherein the diffractive properties can be changed by a mechanical and/or electrical and/or acoustic effect.

In a particular variant, a first diffractive optical component and a second diffractive optical component can each be movable with respect to one another in a plane perpendicular to the optical axis, in particular can be arranged so as to be laterally displaceable and/or rotatable about an axis arranged parallel to the optical axis, which axis can also be the optical axis. Lateral displacement means a displacement perpendicular to the optical axis. In a further variant, at least one of the diffractive optical components can have a diffractive structure whose diffractive properties are variable by changing a voltage applied to the diffractive optical component or by changing a current intensity flowing through the diffractive optical component.

In one exemplary embodiment, the wavefront manipulator can comprise two phase plates that are displaceable laterally with respect to one another, for example diffractive Alvarez-Lohmann lenses with diffractive structure elements forming a holographic interference pattern. Diffractive Alvarez-Lohmann lenses having a cubic surface profile are described, for example, in A. Grewe, et al., Opto-mechanische Mikrosysteme zur hyperspektralen Bildgebung (Opto-mechanical microsystems for hyperspectral imaging), Mikrosystemtechnik Kongress 2013 Oct. 14-16, 2013 in Aachen (https://www.tu-ilmenau.de/fileadmin/media/mms/Publikationen/_Gre13_MST-Kongress.pdf). However, within the context of the present invention, the diffractive Alvarez-Lohmann lenses are equipped with holograms.

Electrical variation or electrical switching of the diffractive properties of at least one diffractive structure and thus the wavefront can be achieved, for example, by changing a voltage or a current flow in the vicinity of at least one diffractive optical component. For this purpose, the diffractive optical component can comprise a diffractive layer (DOE layer) that may be switched active/inactive by a voltage, what are known as switchable Bragg gratings. Switchable Bragg gratings are described, for example, in Sutherland, R. L., et al., "Switchable holograms in a new photopolymer-liquid crystal composite" SPIE: Diffractive and Holographic Optics Technology, 2404:132-, Feb. 9-10, 1995 and Sutherland, R. L., et al., "Electrically switchable volume gratings in polymer-dispersed liquid crystals" Appl. Phys. Lett., 64(9): 1074-1076 Feb. 28, 1994.

Furthermore, at least one diffractive optical component can comprise elements that may be polarization-switched by way of voltage, for example liquid crystal layers, in combination with static polarization-sensitive optics, for example meta-surfaces or volume holographic optical elements (vHOE), which deflect light of different polarization directions into different directions. In principle, a configuration with phase plates, metasurfaces, plasmonic elements, and Fresnel elements is possible. An electromagnetic meta-surface is a type of artificial sheet material with a thickness that lies below the wavelength of the radiation to be used. Metasurfaces can be either structured or unstructured, with patterns with sub-wavelength scaling in the horizontal dimensions.

Acoustic variation, in particular switching, can be implemented in that at least one diffractive optical component comprises at least one acousto-optic modulator, for example the diffractive structure has a switchable refractive index distribution. In principle, combinations of the variants described are also possible, for example a switchable Bragg grating for large discrete jumps in position and a lateral displacement for scanning the intermediate regions. The diffractive structure, in particular the holographic interference pattern, of at least one of the diffractive optical components can comprise a center, for example a center axis or center line or midpoint. As the distance from the center increases, in particular in the lateral direction, the distances between the structure elements can decrease or increase. Depending on this, the movement direction of the diffractive optical components relative to one another is to be selected in the case of a desired focusing. The center can form or define a mirror axis in relation to the distances between the structure elements. The diffractive structure, in particular the holographic interference pattern, of at least one of the diffractive optical components can comprise structure elements, wherein the distance, in particular the lateral distance, and/or the orientation of adjacent structure elements, in other words the grating constant and/or the angle (e.g., blaze angle), is described by a polynomial in dependence on the distance from a center of the diffractive structure.

A first diffractive optical component and a second diffractive optical component can be arranged at a specified distance from one another in the axial direction with respect to the optical axis. This distance should preferably be chosen to be as small as possible, for example between 0 and 0.1 mm. Depending on the selected distance, in particular in the case of large distances, taking into account the refractive index of the material present between the diffractive optical components, for example air, should be taken into account when designing the holographic interference patterns applied to the optical components. In other words, other distances between the two diffractive optical components are also possible, but they require an adaptation of the respective holographic interference patterns.

The structure elements of the diffractive structure can be in the form of elevations or depressions or discolorations, for example blackening, or chemical material changes. Furthermore, the structure elements can be configured as regions which are spatially adjacent to one another in the lateral direction and have differing refractive indices. For example, the refractive index of the structure elements can deviate from the refractive index of the material of the respective diffractive optical component by a value of between 0.05 and 0.15, for example 0.01. This can be achieved, for example, by using volume holograms. A photopolymer can be used here as the material.

In a further variant, individual or specified regions can have a specific refractive index difference. The refractive index difference of the individual regions can depend on the distance of the respective region from the center of the diffractive structure. The center can in this case be a mirror axis. The refractive index difference may increase or decrease with increasing distance of the region from the center. The increase or decrease can here proceed according to a specified polynomial. Advantageously, the diffractive structure can have a variable refractive index distribution, for example one that is switchable between different states. This makes it possible, for example, to switch between discrete states, in particular foci.

At least one of the diffractive structures can be formed by a volume hologram and/or a surface hologram and/or an amplitude hologram and/or a phase hologram and/or a transmission hologram and/or a white light hologram and/or a hologram that is able to be reconstructed under white light and/or a true-color hologram.

The following description of different types of holograms is taken from https://www.spektrum.de/lexikon/optik/holographie/1343: A hologram can be recorded both in thin, light-sensitive layers (planar hologram) and in light-sensitive, thick media (volume hologram). The thickness of the storage material used plays an important role in the production of holograms. The object and reference waves form a spatially standing interference pattern, which is registered by the optical storage medium (hologram). During the reconstruction, both types of hologram are reconstructed with the original reference wave. The planar hologram adds the various orders of diffraction that are also expected with a normal planar grating to the passing zero order of diffraction. The first order of diffraction represents the reconstructed image, here the reconstructed plane wave. In the volume hologram, by contrast, according to the law of Bragg reflection, only the +1st or the −1st orders of diffraction are generated in addition to the zero order of diffraction. A thick optical storage medium offers the advantage that a plurality of interference structures can be superposed in it; the volume hologram then consists of many superposed interference structures. By maintaining specific angles or wavelengths during the reconstruction, there can be an image-by-image reconstruction from the volume hologram. With an amplitude hologram, the interference pattern is recorded as a distribution of blackening (the hologram modulates the reconstruction wave via the absorbance). In a phase hologram, the interference pattern is stored within the medium in the form of a surface relief or a refractive index distribution. The hologram then influences the phase of the reconstruction wave.

At least one of the diffractive optical components can be designed as a plate or sheet or film. A configuration as a sheet or film has the advantage that the wavefront manipulator requires minimal installation space. A configuration in the form of a plate has the advantage of being more robust and having a longer service life, while likewise taking up comparatively little installation space. Within the context of the present invention, a plate is understood to mean a component that is designed to be not inherently deformable. A sheet is understood to mean an optical component which is deformable in the z-direction, i.e., perpendicular to an xy-plane of a Cartesian coordinate system, with respect to the plane spanned by the surface of said optical component in the xy-plane. For example, a plastic sheet can be used. A film is understood to mean a contiguous layer of material which is preferably applied to a substrate. The film, for example a silver halide film, can be fixedly or detachably connected to the substrate in this case.

In one preferred configuration, at least one diffractive optical component has a thickness of less than 1 mm, for example a thickness of between 0.1 and 0.5 mm. In this way, extremely space-saving focusing or defocusing of waves, in particular light waves, can be achieved.

The diffractive optical components may be at least partially transparent, in particular transparent to visible light. This is advantageous in particular in connection with the use for head-up displays or smartglasses or AR (augmented reality) glasses.

In a variant, the wavefront manipulator comprises four diffractive optical components, wherein a first and a second diffractive optical component are arranged immediately adjacent to one another and so as to be displaceable with respect to one another in a first lateral direction, and a third and a fourth diffractive optical component are arranged immediately adjacent to one another and so as to be displaceable with respect to one another in a second lateral direction. The first and the second lateral direction can, for example, run perpendicularly or at another specified angle to one another. While in a configuration with two diffractive optical components, of which each has a holographic interference pattern arranged in a lateral direction, it is possible to focus waves to form a line in a plane, focusing waves to form a point in a plane becomes possible by means of the described configuration with four diffractive optical components, wherein each optical component has a holographic interference pattern extending in a lateral direction.

In a further variant, at least two diffractive optical components can be arranged so as to be rotatable in relation to one another about an axis parallel to the optical axis. In the above-described variant with four diffractive optical components, for example, the first and the second diffractive optical component can be arranged so as to be jointly rotatable in relation to the third and the fourth diffractive optical component. However, in addition or alternatively, the first and the second diffractive optical component can also be arranged so as to be rotatable in relation to one another. In the same way, the third and the fourth diffractive optical component can also be arranged so as to be rotatable in relation to one another. The second and the third diffractive optical component can be designed to be firmly connected to one another. For example, the second and the third diffractive optical component can be integrated in a single component.

In an additional variant, the wavefront manipulator comprises three diffractive optical components, wherein a third diffractive optical component is arranged in the direction of the optical axis between a first and a second diffractive optical component. In particular, the third diffractive optical component can be arranged so as to be movable relative to the first and the second diffractive optical component, for example movable by translation and/or rotation, or can be designed to be variable with regard to its diffractive properties.

In a further variant, the wavefront manipulator has at least one diffractive optical component which, in the plane extending perpendicular to the optical axis, comprises a holographic interference pattern designed in the form of a two-dimensional or three-dimensional grating. With this configuration, it is possible, in the case of two correspondingly configured diffractive optical components, to achieve focusing onto a point by displacing said optical components at an angle of 45 degrees to one another.

Via the variants described, it is possible to focus waves, in particular light waves, onto a point or a line running on the optical axis or parallel to the optical axis. By means of a volume hologram as the structure of at least one of the diffractive optical components, it is additionally possible to focus onto a point, in other words to also focus in the direction of the optical axis or in the z-direction.

The waveguide arrangement according to another example embodiment can comprise at least one waveguide and at least one wavefront manipulator, which has already been described. The waveguide can be designed as a light guide. The wavefront manipulator is advantageously operatively connected to the waveguide, i.e., is designed in particular for manipulating wavefronts to be coupled into the waveguide or coupled out of the waveguide and is preferably correspondingly spatially connected to the waveguide. The waveguide can have an entrance for coupling in waves, for example light waves, and an exit for coupling out waves, for example light waves.

A wavefront manipulator as described above can be arranged at the entrance and/or the exit, advantageously in the beam path along an optical axis, which is defined by the entrance or the exit. The optical axis of a wavefront manipulator arranged at the entrance of the waveguide can here be identical to an optical axis of the waveguide at the entrance or run parallel to it. In addition or alternatively, the optical axis of a wavefront manipulator arranged at the exit of the waveguide can be identical to an optical axis of the waveguide at the exit or run parallel to it.

For example, the at least one wavefront manipulator can be designed as an input coupling element and/or as an output coupling element with respect to the waveguide, i.e., it can be designed for coupling waves, in particular light waves, into or out of the waveguide. The at least one wavefront manipulator can be at least partially integrated into the waveguide. In an advantageous variant, one of the diffractive optical components of the wavefront manipulator, in particular the diffractive structure of the diffractive optical component, can be part of the waveguide, for example be arranged inside the waveguide.

The waveguide arrangement has the advantages already mentioned above in connection with the wavefront manipulator. In particular, it makes efficient transmission and/or output of wavefronts that have been manipulated in a targeted manner possible, in particular with a wide focus range while at the same time requiring little installation space.

According to a further aspect, the optical device can be, for example, an optical observation device such as a microscope, in particular a surgical microscope, a telescope, a camera, a waveguide, an objective lens, in particular a zoom lens, and/or a holographic lens, etc. However, it can also be another optical device, such as for example an optical measurement device. Said device is equipped with at least one wavefront manipulator. The effects and advantages described with reference to the wavefront manipulator can therefore be attained in the optical device.

The camera can in particular be a holographic camera and/or a camera for a cell phone and/or a microscope camera. The display apparatus can be smartglasses or a projector, in particular a projector designed to focus colors individually, or a head-up display, in particular for use in an automobile, or a display apparatus designed for a microscope.

When the wavefront manipulator is used in connection with a HoloCam, the present invention makes possible a HoloCam that is switchable with regard to the focal plane. It is possible here to either switch between individual discrete states or cover a continuous range of values between end states.

According to a further aspect, the use of at least one wavefront manipulator and/or a waveguide arrangement as described herein comprises using the at least one wavefront manipulator and/or the waveguide arrangement to focus wavefronts, in particular light wavefronts.

In principle, the present invention allows a variation of the focus distance to the object, in particular the realization of a switchable quadratic phase function and/or linear phase function, a variation of the main beam direction, for example switching between different field positions, to capture a larger field of view (FOV). In addition, a sharp image presentation of an object at a fixed distance can be achieved for different wavelengths.

In the following description, the description of the shape of a refractive free-form surface will be represented by a polynomial expansion which has non-zero expansion coefficients in a finite number of specific polynomial orders and can be used analogously for a diffractive structure. The diffractive structure associated with a refractive free-form surface is described by a polynomial expansion which has non-zero expansion coefficients in the same polynomial orders as the polynomial expansion of the refractive free-form surface. The expansion coefficients of a polynomial expansion describing a refractive free-form surface and of the polynomial expansion describing the associated diffractive structure, which are each associated with the same polynomial order, in this case have a fixed functional relationship to one another. Here, the expansion coefficients of a polynomial expansion describing a refractive free-form surface and of the polynomial expansion describing the associated diffractive structure, with each expansion coefficient being associated with the same polynomial order, can have a linear functional relationship in particular. The functional relationship can depend in particular on the material used in the respective optical component, i.e., on its dispersion. In particular, the same functional relationship can be present here for all polynomial orders with non-zero coefficients.

The polynomials of the first and the second polynomial expansion can each depend on two variables that represent different directions perpendicular to the optical axis of the optical element. The two directions can here be perpendicular to one another, wherein the one direction corresponds to the movement direction of the optical components and wherein the polynomial expansion describing a refractive free-form surface and the polynomial expansion describing the associated diffractive structure each have only odd polynomial orders in the variable that represents the movement direction of the optical components. Each of the polynomial expansion describing a refractive free-form surface and the polynomial expansion describing the associated diffractive structure then only need to have even polynomial orders in the variable that represents the direction perpendicular to the movement direction of the optical components.

Further details relating to the construction of the diffractive surfaces and to the use of optical elements provided with diffractive structures and free-form surfaces are described in DE 10 2011 055 777, to which reference is made with regard to these aspects.

The invention is explained in greater detail below on the basis of exemplary embodiments and with reference to the accompanying figures. Although the invention is more specifically illustrated and described in detail by means of the preferred exemplary embodiments, nevertheless the invention is not restricted by the examples disclosed and other variations can be derived therefrom by a person skilled in the art, without departing from the scope of protection of the invention.

The figures are not necessarily accurate in every detail and to scale, and can be presented in enlarged or reduced form for the purpose of better clarity. For this reason, functional details disclosed here should not be understood to be limiting, but merely to be an illustrative basis that gives guidance to a person skilled in this technical field for using the present invention in various ways.

Figure 1:
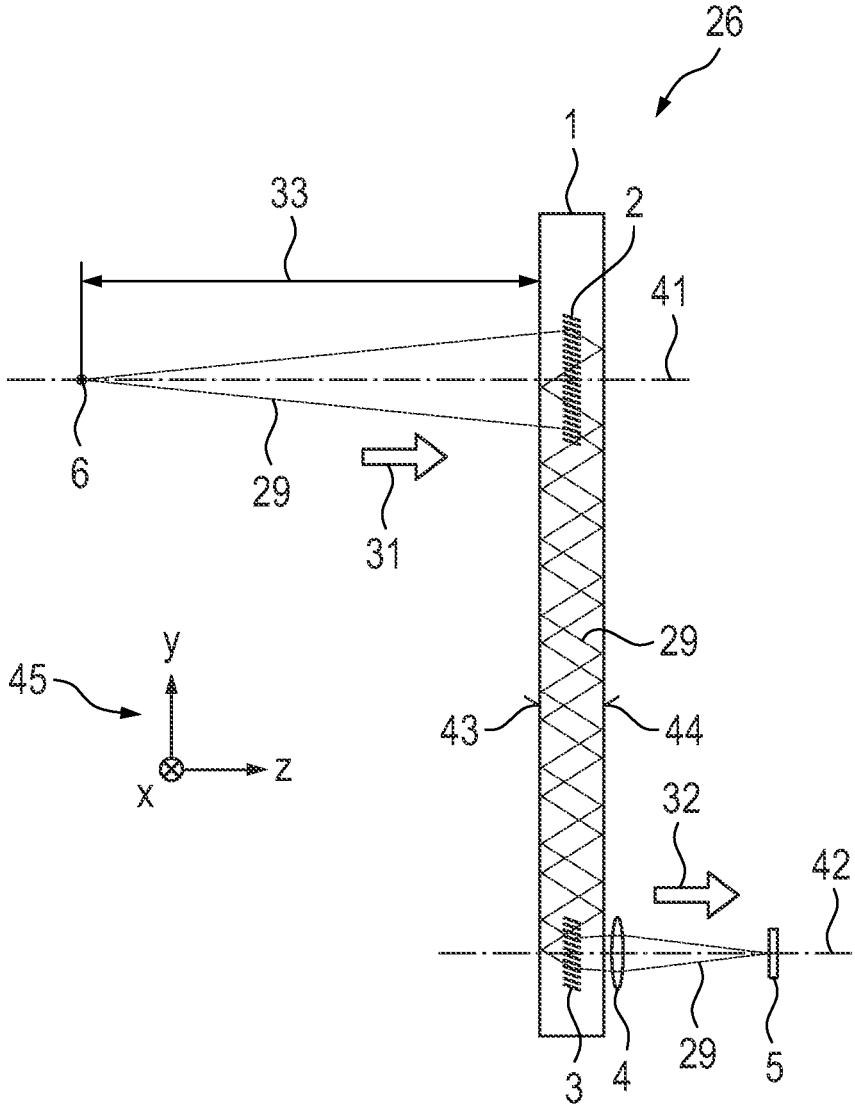
FIG. 1 schematically shows a holographic camera (Holo-Cam) in a sectional view.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

FIG. 1 schematically shows a holographic camera (Holo-Cam) in a sectional view. The HoloCam 26 comprises a waveguide 1, an objective lens 4, and a camera or sensor 5. The waveguide 1 comprises an input-coupling hologram 2 and an output-coupling hologram 3. In the propagation direction of the waves, the objective lens 4 is arranged downstream of the output-coupling hologram 3 outside the waveguide 1 and the camera or the sensor 5 is arranged downstream of the objective lens 4. The optical axis of the input-coupling hologram 2 is denoted by reference sign 41. The optical axis of the output-coupling hologram 3, the objective lens 4, and the camera or the sensor 5 is denoted by reference sign 42. The propagation direction of the waves, in particular light waves, to the waveguide 1 is denoted by an arrow 31. The propagation direction of the waves leaving the waveguide 1 through the output-coupling hologram 3 is denoted by an arrow 32. The propagation of the waves is marked as a beam path by lines with reference sign 29.

A fixed focus 6 is realized by way of the input-coupling hologram 2. Said focus is disposed at a distance 31 from the waveguide 1. Light waves emanating from the focus 6 with the focal length 33, which can be a focal point, a focal line or a focal plane, are coupled into the waveguide 1 via the input-coupling hologram 2, transmitted therein to the output-coupling hologram 3, and guided, via the output-coupling hologram 3, through the objective lens 4 to the camera or the sensor 5. In the example shown in FIG. 1, the optical axes 41 and 42 extend parallel to the z-axis of a Cartesian coordinate system 45. The surfaces 43 and 44 of the waveguide 1 extend in the xy-plane of the coordinate system 45. The input-coupling hologram 2 and the output-coupling hologram 3 each have a holographic indifference pattern which extends in the y-direction or in the xy-plane, i.e., perpendicular to the respective optical axis 41 or 42, i.e., lateral to the respective optical axis.

Figure 2:
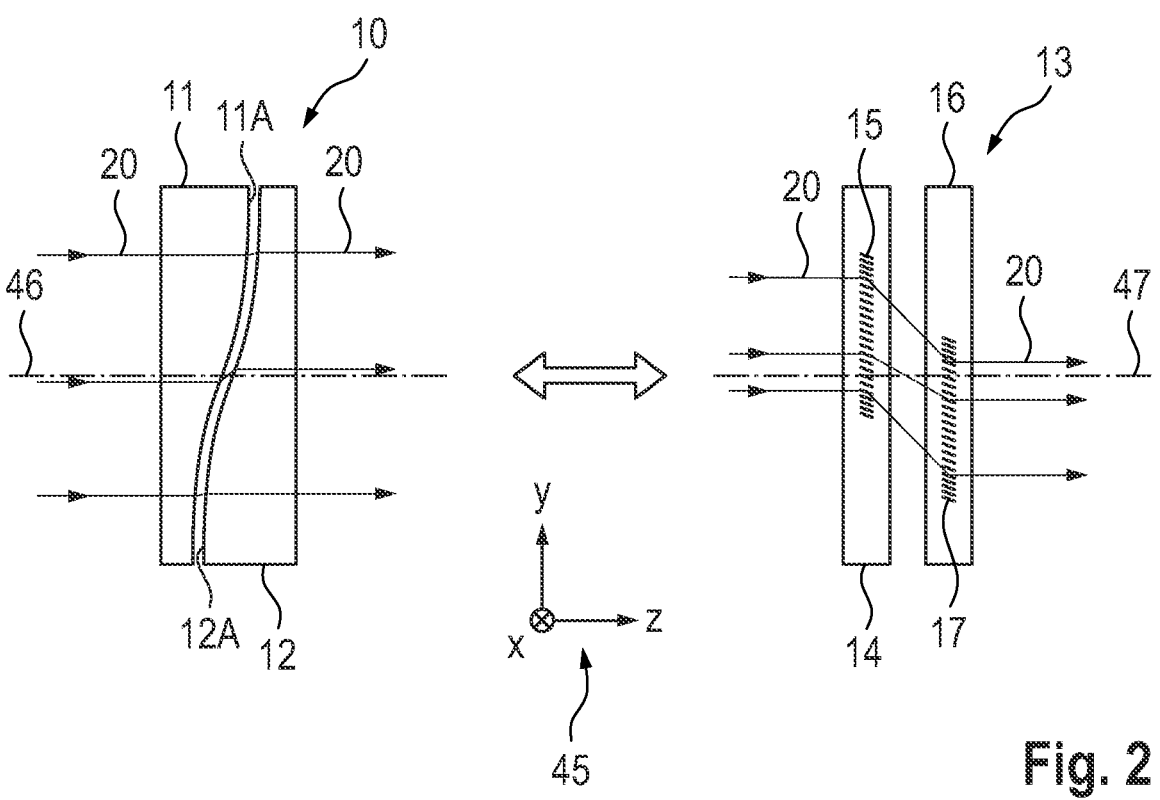
FIG. 2 schematically shows a refractive focus system and a diffractive focus system.

FIG. 2 schematically shows a refractive focus system 12 and a diffractive focus system 13. The collimated beam path through the two focus systems is denoted by arrows with reference sign 20. The refractive focus system 10 shown comprises a first Alvarez element 11 comprising a first free-form surface 11A and a second Alvarez element 12 comprising a second free-form surface 12A. The free-form surfaces 11A and 12A are arranged facing each other. The Alvarez elements 11 and 12 are disposed at a distance from one another in the direction of the optical axis 46. The waves propagating through the focus system 10, in particular light waves, are changed by the refractive focus system 10 by refraction at the free-form surfaces 11A and 12A in dependence on the distance between the free-form surfaces 11A and 12A and in dependence on the lateral positions of the Alvarez Elements 11 and 12 relative to one another with respect to their propagation direction and in particular their lateral distance from the optical axis 46. In the variant shown in FIG. 2, the refractive focus system 10 causes a lateral shift.

The diffractive focus system 13 shown in FIG. 2 comprises a first diffractive optical component 14, which is designed as a substrate with a hologram 15, and a second diffractive optical component 16, which is designed as a substrate with a hologram 17. The first and the second diffractive optical component 14 and 16 are arranged at an axial distance from one another and extend laterally to the optical axis 47. The holograms 15 and 17 likewise extend laterally or perpendicular to the optical axis 47. The propagation direction of the waves, in particular light waves, is changed diffractively by the diffractive focus system 13 by diffraction at the holograms 15 and 17. In the variant shown in FIG. 2, a shift to the optical axis 47 is effected. Owing to both focus systems shown in FIG. 2, a lateral displacement of the Alvarez elements 11 and 12 with respect to one another and additionally of the diffractive optical components 14 and 16 with respect to one another can bring about focusing, i.e., a convergent beam path, or defocusing, i.e., a divergent beam path, of the waves.

Figure 3:
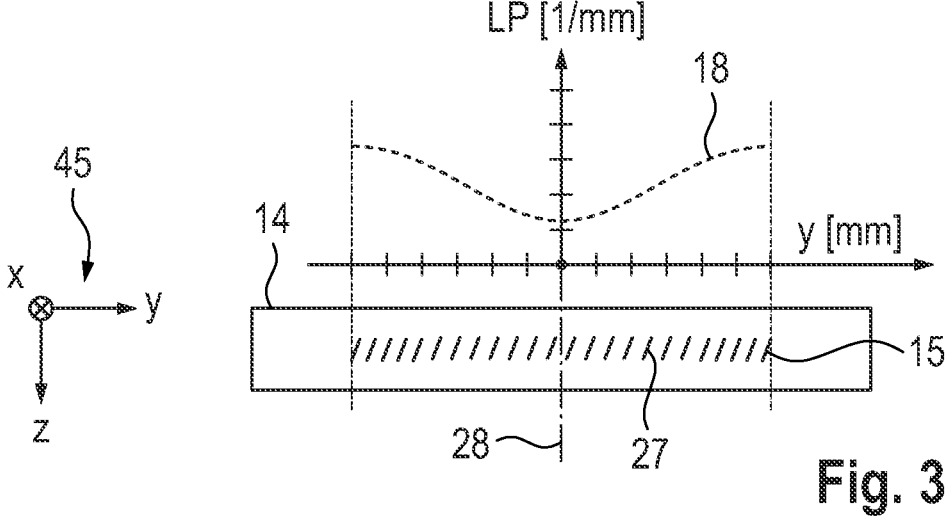
FIG. 3 shows a diffractive optical component with a hologram in exemplary fashion and a diagram showing the line pitch as a function of a distance from a center.

FIG. 3 shows a diffractive optical component 14 with a hologram 15 in exemplary fashion and a diagram showing the line pitch 18 in dependence on a distance from a center 28 of the diffractive structure. In this case, the distance y of the structure elements, in particular the grating lines of the hologram grating, from the center or a center line, in particular mirror axis, 28 in mm is plotted on the x-axis. The line pitch (LP) 18 is plotted in 1/mm on the y-axis. In the variant shown, the line pitch 18 is at a minimum in the region of the center line 28 and increases as the distance from the center line 28 increases. As an alternative to the variant shown, the line pitch in the region of the center line 28 can also be at a maximum and decrease as the distance from the center line 28 increases.

Figure 4:
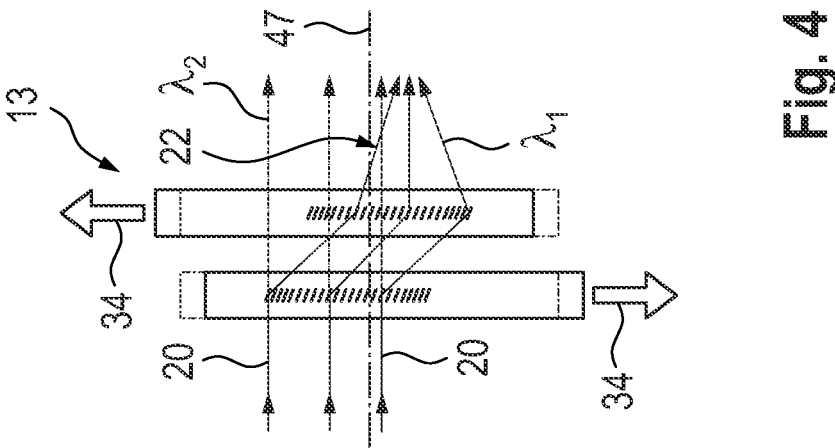
FIG. 4 shows a wavefront manipulator in the form of a diffractive focus system in three different operating states.
Figure 4:
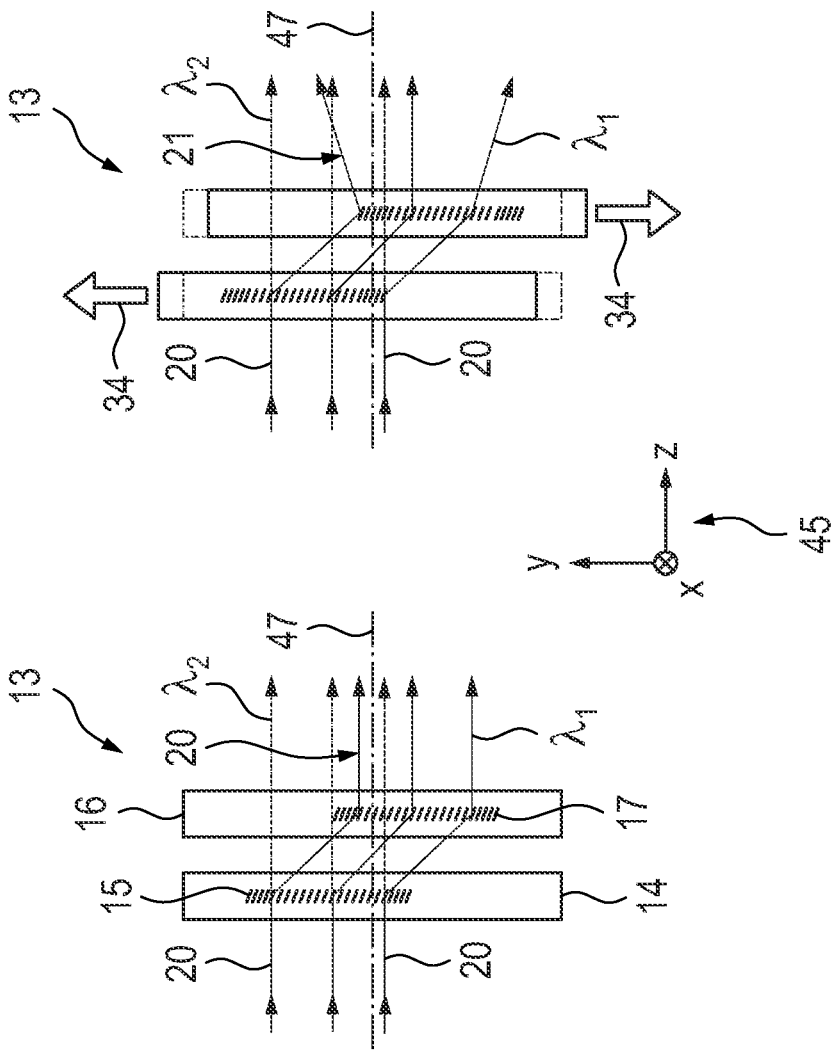

FIG. 4 shows a wavefront manipulator 13 according to the invention in the form of a diffractive focus system with wavelength-selective volume holograms in three different operating states. The variant shown on the left corresponds here to the variant shown in FIG. 2. In the variant shown in the middle, the first diffractive component 14 and the second diffractive component 16 were displaced with respect to one another laterally or perpendicular to the optical axis 47. Consequently, in deviation from the collimated beam path 20 attained in the operating state shown on the left, a divergent beam path 21 for the corresponding design wavelength $\lambda_1$ is realized. In the variant shown on the right in FIG. 4, the diffractive optical components 14 and 16 were laterally displaced with respect to one another in a direction opposite to that shown in the middle variant. This displacement resulted in a convergent beam path 22 for the corresponding design wavelength $\lambda_1$ being realized. The lateral displacement of the diffractive optical components 14 and 16 is denoted by arrows with reference sign 34. The direction and the extent in and by which the diffractive optical components 14 and 16 need to be displaced with respect to one another in order to achieve a desired beam path depends here on the distribution of the line pitch 18, as shown in FIG. 3, for example. Wavelengths $\lambda_2$, which deviate from the design wavelength $\lambda_1$, are not influenced by the volume hologram and remain without a virtual or real optical image presentation even after they have through.

The holograms used within the context of the present invention can each be produced by exposure of a substrate with photosensitive material.

Figure 5:
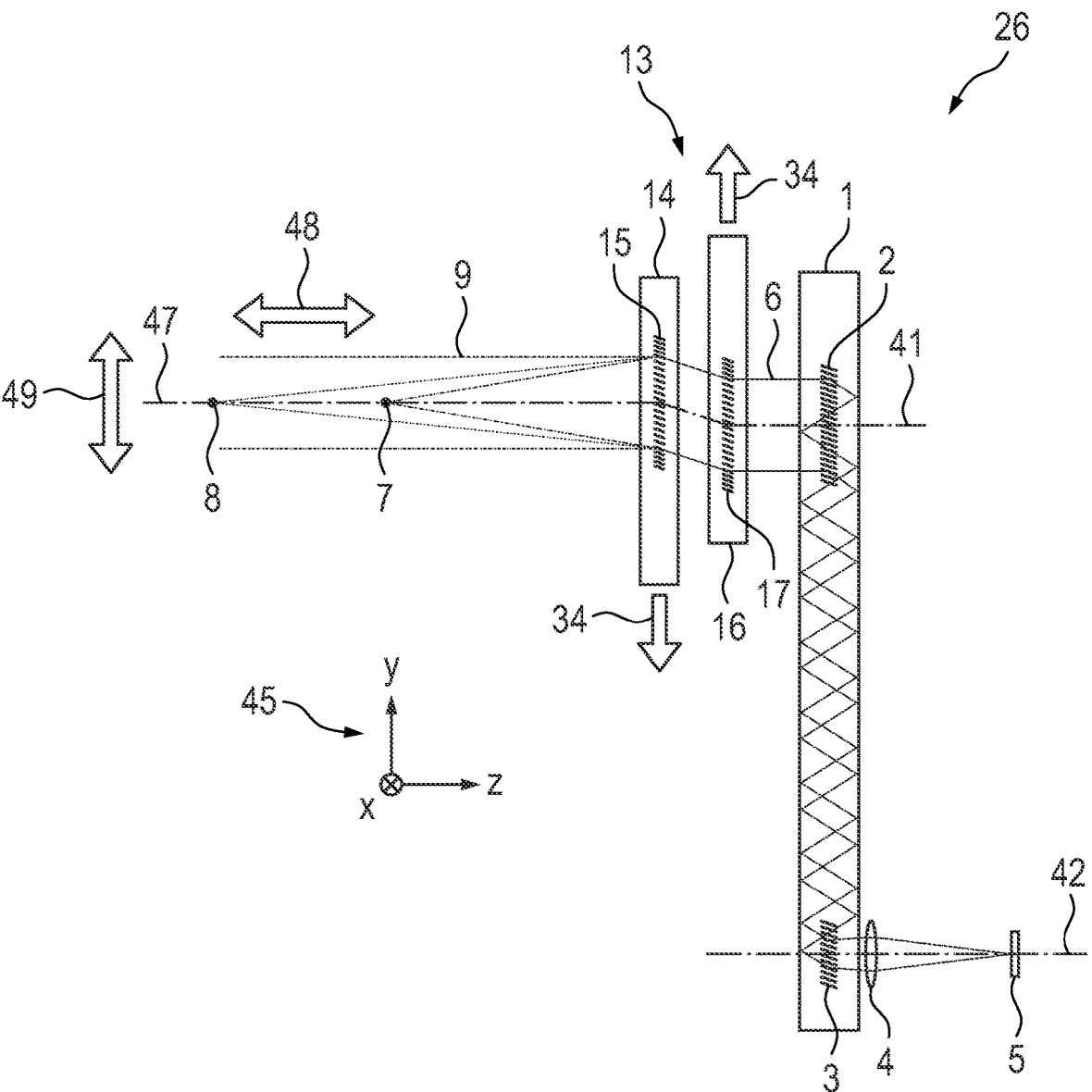
FIG. 5 schematically shows the HoloCam shown in FIG. 1 with a wavefront manipulator arranged upstream of the input-coupling hologram.

By means of the wavefront manipulator 13 according to the invention, focusing or defocusing can be achieved, as shown in FIG. 4, by means of the free-form wavefront generated by the holograms. An application example in connection with a HoloCam is shown schematically in FIG. 5. FIG. 5 shows the HoloCam 26 shown in FIG. 1 with a wavefront manipulator 13 according to the invention arranged in front of the input-coupling hologram 2. At the same time, FIG. 5 shows an embodiment variant of a waveguide arrangement according to the invention.

The otherwise fixed focus can be varied by a displacement 34 of the diffractive optical components 14 and 16 with respect to one another. For example, a collimated beam path or a focus 9 at infinity or a first focus 7 or a second focus 8 can thus be set. The focus can therefore be displaced along the optical axis 47. This is denoted by an arrow 48. In addition or alternatively, a shift in the transverse direction, i.e., a displacement of the optical axis 47 or a transverse shift of the focus from the optical axis 41, which is specified by the input-coupling hologram 2, can also be achieved. This is denoted by an arrow 49.

Figure 6:
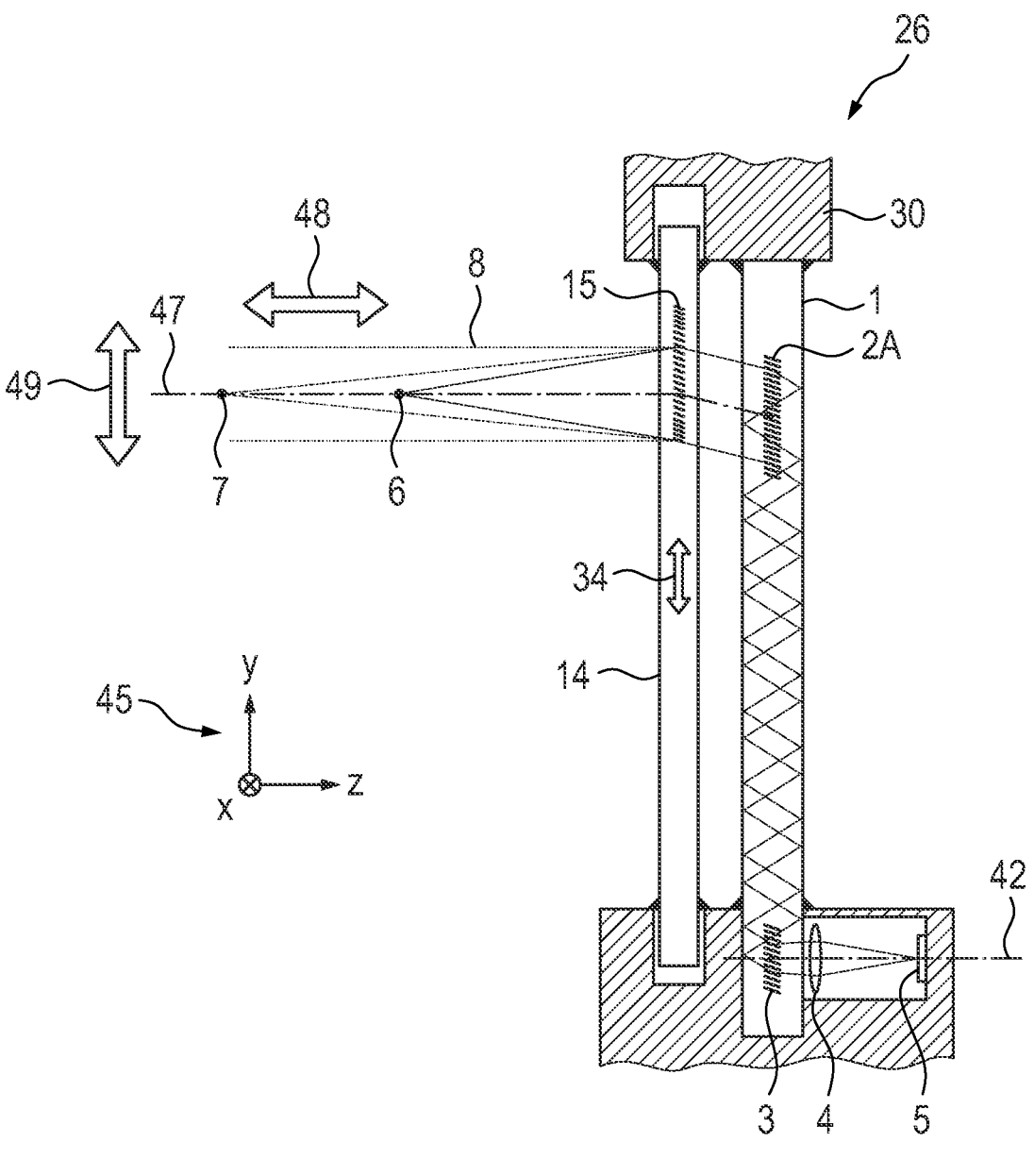
FIG. 6 schematically shows a further embodiment variant for a HoloCam with a wavefront manipulator.

FIG. 6 schematically shows a further embodiment variant of a HoloCam with a wavefront manipulator according to the invention. At the same time, FIG. 6 shows an embodiment variant of a waveguide arrangement according to the invention. In this variant, the second diffractive optical component is integrated into the waveguide 1 of the HoloCam and at the same time forms the input-coupling hologram 2A. In the variant shown in FIG. 6, the HoloCam 26 comprises a housing 30. Both the waveguide 1 and the first diffractive optical component 14 are clamped into the housing 30 in this case. The first diffractive optical component 14 is arranged in the housing 30 in such a way here that it is displaceable transversely or laterally to the optical axis 47.

In addition to the variants shown in FIGS. 4 and 5, two wavefront manipulators 13 can also be combined with one another and preferably arranged one behind the other, wherein the diffractive optical components of a first wavefront manipulator are arranged so as to be displaceable with respect to one another in a first transverse or lateral direction, and a second wavefront manipulator is configured in a way such that its diffractive optical components are displaceable with respect to one another in a second transverse or lateral direction. In this case, the first lateral direction can be disposed perpendicular to the second lateral direction or have a fixed angle thereto. Such a configuration makes focusing on a focal point in a focal plane possible. In principle, the holograms used can be in the form of volume holograms. Focusing in the z-direction can also be realized by a corresponding configuration of the volume hologram. Furthermore, the holograms used can be in the form of two-dimensional hologram gratings extending in the xy-plane. In the case of a configuration as a two-dimensional hologram grating, focusing on a focal point in a defined focal plane, i.e., focusing in the xy- and z-directions, can also be achieved by means of only one wavefront manipulator, i.e., using only two diffractive optical components that are displaceable with respect to one another.

Figure 7:
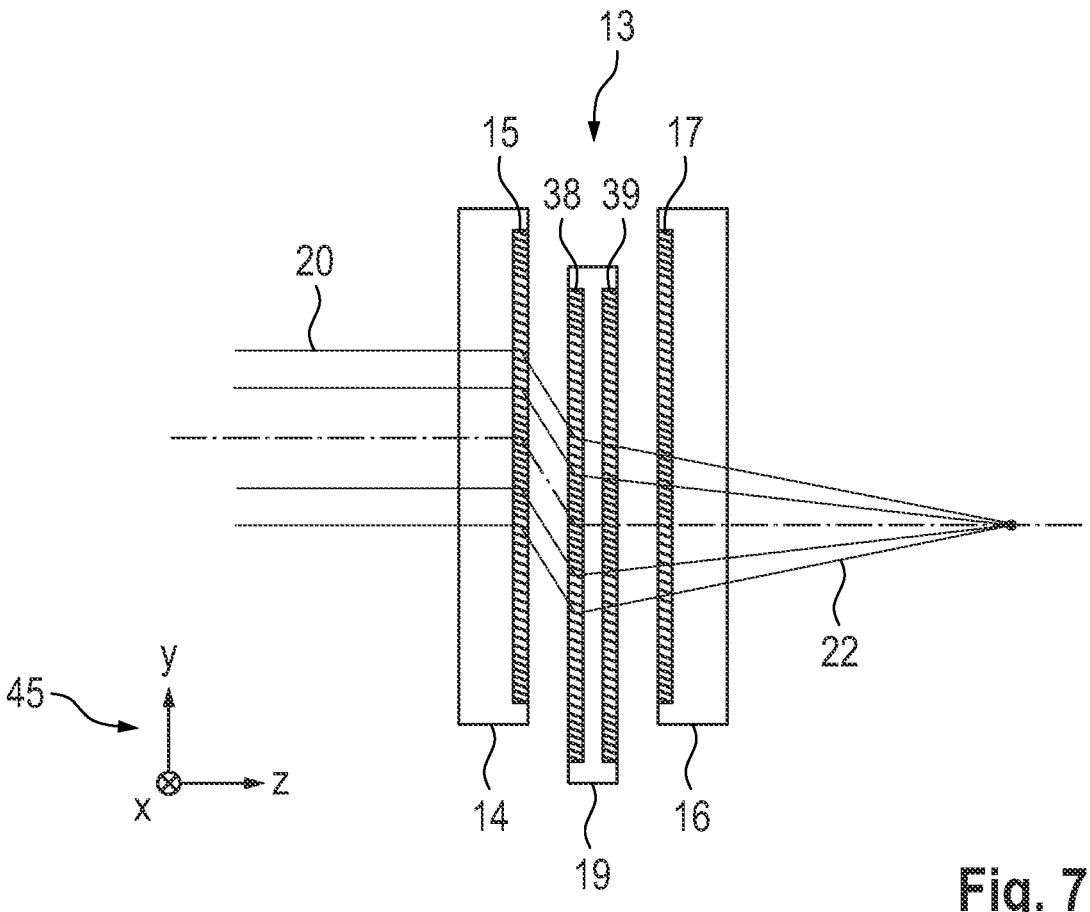
FIG. 7 schematically shows a further embodiment variant of a wavefront manipulator.

A further embodiment variant is shown in FIGS. 7 and 8. In this variant, a third diffractive optical component 19 is arranged between the first diffractive optical component 14 and the second diffractive optical component 16. The third diffractive optical component comprises two holograms 38 and 39. A first hologram 38 is here arranged in the surface facing the first diffractive optical component 14, and a second hologram 39 is arranged in the surface facing the second diffractive optical component 16. The first diffractive optical component 14 and the third diffractive optical component 19 and the second diffractive optical component 16 are each disposed at a distance from one another in the axial direction. This distance is as small as possible here in order to keep the installation space as small as possible and also to avoid the influence of the medium located between the respective diffractive optical components, in particular air, on the course of the beam. The distance is preferably between 0 and 0.1 mm. The greater the distance selected is, the more the refraction by the medium located in the intermediate space, in particular by air, needs to be taken into account when creating the holograms used.

Figure 8A:
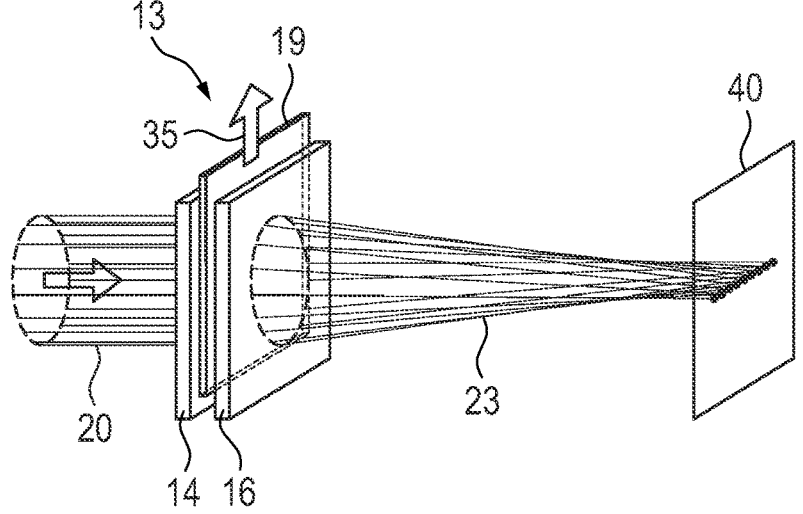
FIGS. 8A, 8B and 8C schematically show, in perspective views, various focusing options by means of the wavefront manipulator shown in FIG. 7.
Figure 8A:
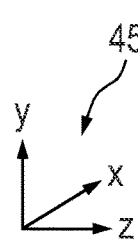
Figure 8B:
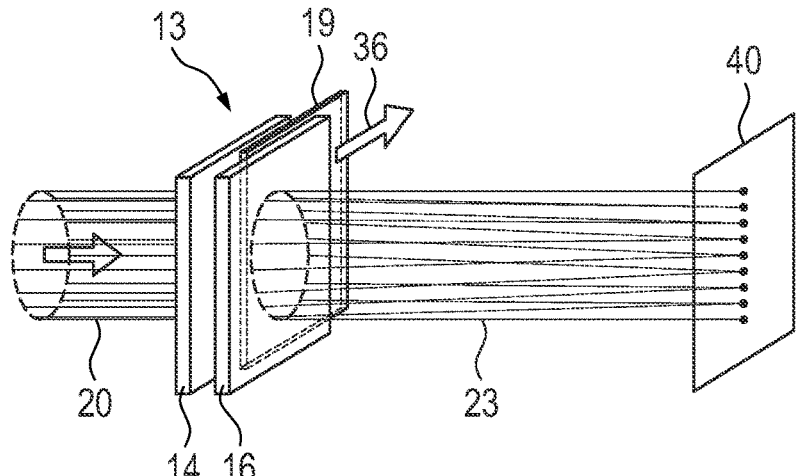
Figure 8C:
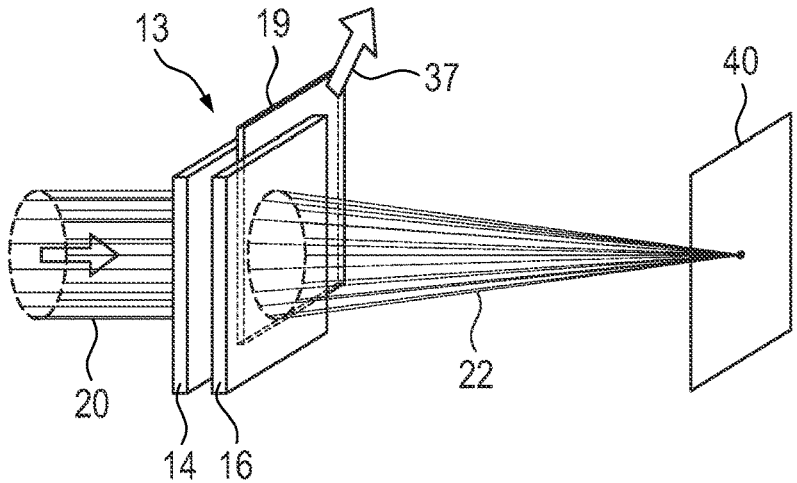

FIGS. 8A, 8B and 8C schematically show a perspective view of various focusing options by means of the wavefront manipulator 13 shown in FIG. 7. In FIG. 8A, the third diffractive optical component 19 has been displaced in the y-direction for focusing purposes. This is denoted by an arrow 35. As a result, focusing on a focal line running in the x-direction has been achieved in the focal plane 40. In FIG. 8B, the third diffractive optical component 19 has been displaced in the x-direction. This is denoted by an arrow 36. As a result, focusing on a line along the y-direction has been achieved in the focal plane 40. In FIG. 8C, the third diffractive optical component 19 has been displaced both in the x-direction and in the y-direction, for example at an angle of 45° to the x- and y-directions. This is denoted by an arrow 37. Focusing on a focal point in the focal plane 40 is realized by this displacement. Furthermore, the focal plane 40 can be displaced in the axial direction by displacing the first diffractive optical component 14 and the second diffractive optical component 16 with respect to one another.

In principle, the wavefront manipulator according to the invention can be designed in a way such that the different focal planes and the different focus variants are continuously adjustable or can be switched between discrete states.

Figure 9:
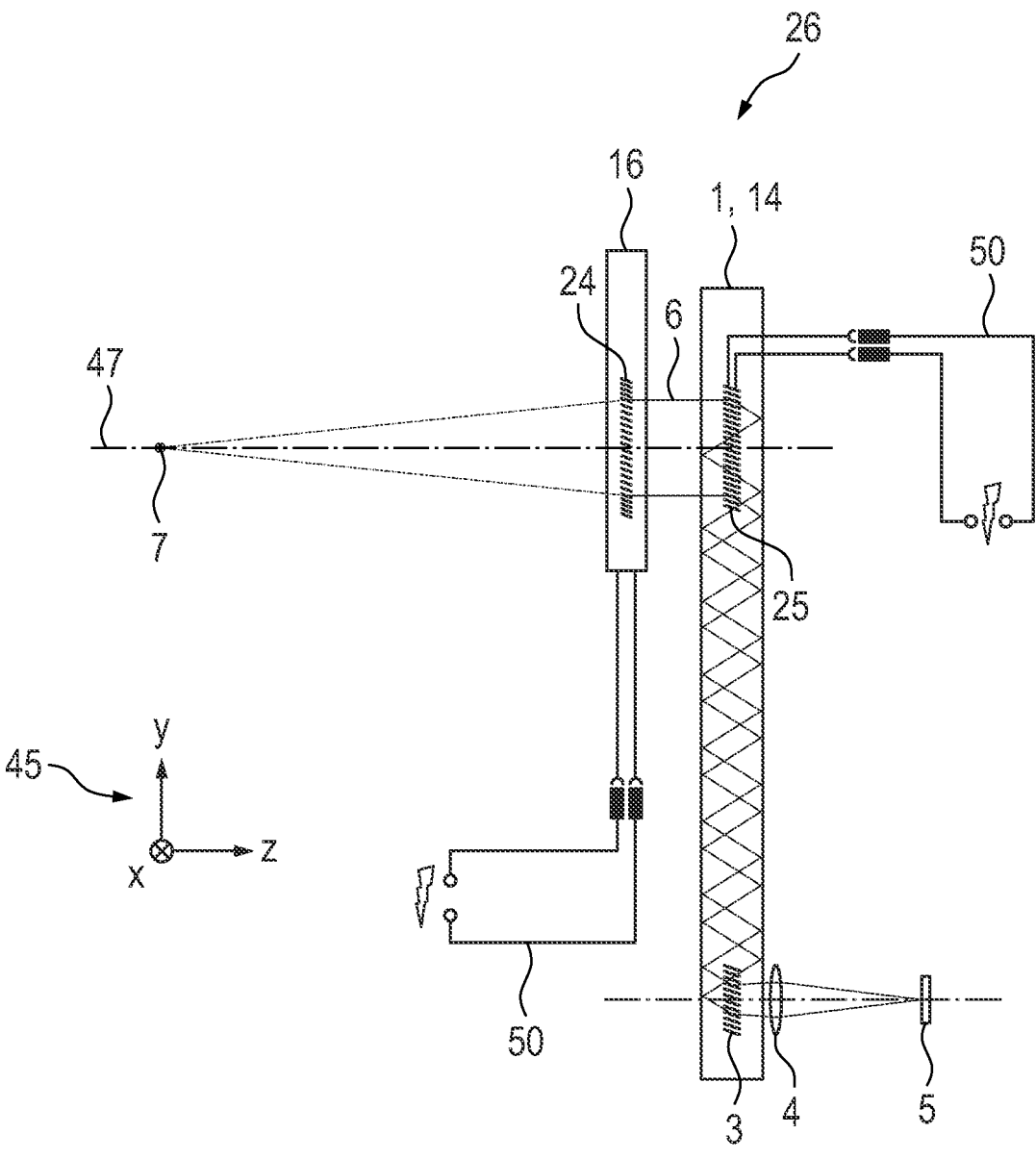
FIG. 9 schematically shows a first variant of a HoloCam with a switchable wavefront manipulator.

Embodiment variants for a switchable wavefront manipulator in connection with a HoloCam are explained below with reference to FIGS. 9 and 10. In these variants, the diffractive optical components are designed as switchable diffractive optical elements or holographic optical elements or phase plates. In FIG. 9, the first hologram 25 and the second hologram 24 are designed as holograms that are switchable with regard to their diffractive properties by way of applying a voltage. The first hologram 25, like the hologram 2A in FIG. 6, is here integrated into the waveguide 1 as an input-coupling hologram. It is connected to an electrical circuit 50, through which its state is switchable between at least two different diffractive states. The switchable holograms can be designed as switchable Bragg gratings.

The second diffractive optical component 16 likewise comprises a switchable hologram 24. The second diffractive optical component 16 is likewise connected to an electrical circuit 50, with which the hologram 24 designed for focusing is switchable between at least two different diffractive states. The hologram 25 integrated into the waveguide 1 is designed as an input-coupling hologram. The waveguide 1 thus simultaneously represents the first diffractive optical component 14. By switching the holograms 24 and/or 25 between different diffractive states, the focus 7 can be varied in the x-, y-, and z-directions.

Figure 10:
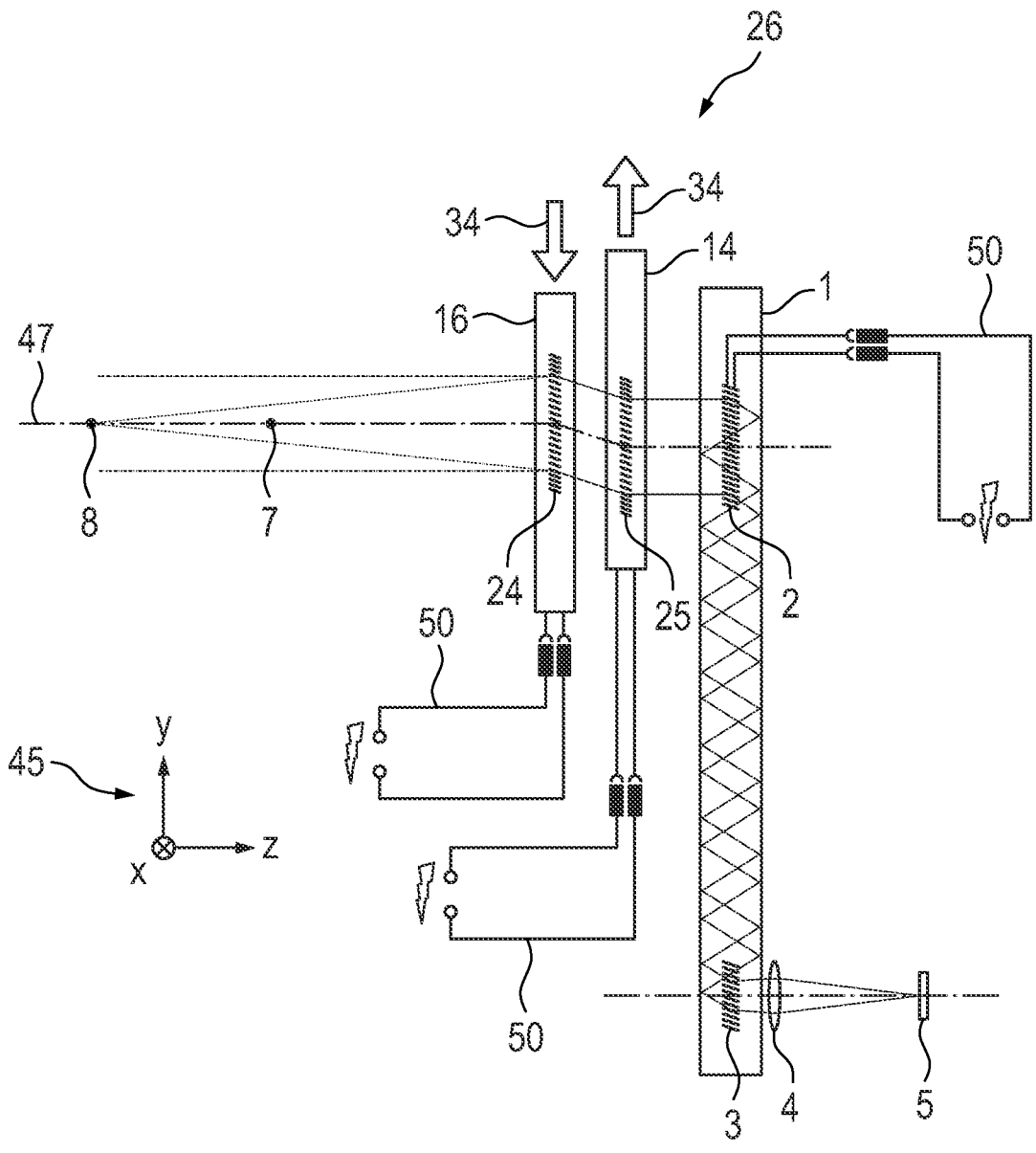
FIG. 10 schematically shows a second variant of a Holo-Cam with a switchable wavefront manipulator.

FIG. 10 shows a variant of the example shown in FIG. 5 with switchable holograms. This variant combines the advantages of switchability, i.e., the possibility of changing between discrete settings of the focus, and the possibility of a lateral displacement of the switchable diffractive optical components 14 and 16 and of a switchable input-coupling hologram 2 with respect to one another, i.e., the possibility of continuously changing the focus. In the configuration shown in FIG. 10, the holograms of the first diffractive optical component 14 and of the second diffractive optical component 16, and also the input-coupling hologram 2 integrated into the waveguide 1, can be switched between discrete diffractive states. In addition, the components can be displaced laterally with respect to one another, which is denoted by arrows 34.

In principle, the holograms can be designed as two-dimensional or three-dimensional hologram gratings in all the embodiment variants shown. Furthermore, the individual diffractive optical components can be rotated or twisted in relation to one another about the optical axis or about an axis running parallel to the optical axis. Focusing can also be achieved in this way. In principle, the diffractive optical components can be designed as plates, sheets, or films. In the case of a configuration as a film, the respective films are preferably applied to a substrate. Such a configuration is particularly suitable for the embodiment variants shown in FIGS. 7 and 8.

In addition, the wavefront manipulator can comprise further optical components, which are arranged upstream of the diffractive optical components, for example. For example, one or more free-form lenses, one or more lenses, for example aspherical lenses, and/or mirrors, can be arranged upstream of the diffractive optical components in the beam direction. Furthermore, it is possible for a bandwidth filter to be arranged upstream of the diffractive optical components.

Figure 11:
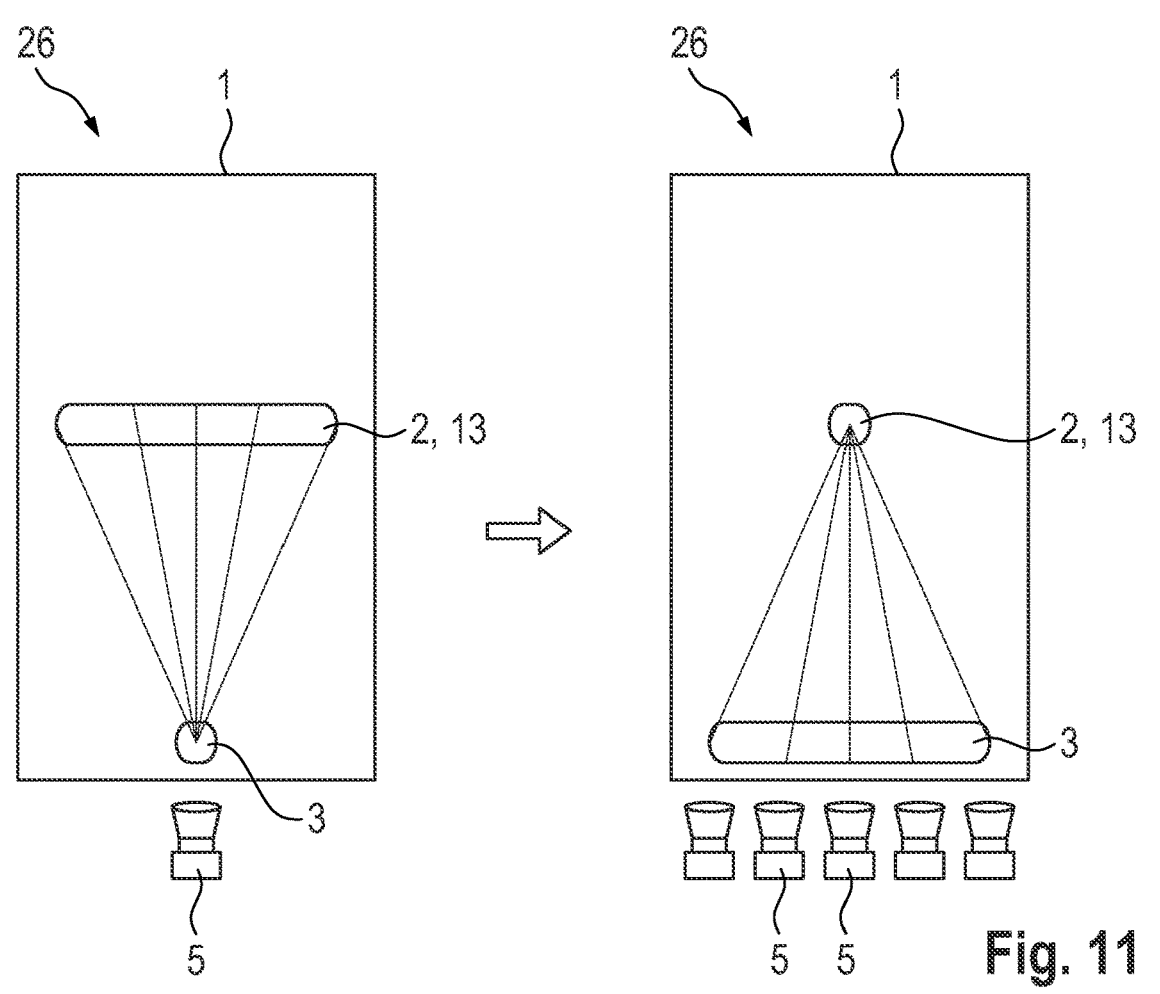
FIG. 11 schematically shows two variants for relative dimensioning of the input-coupling hologram and thus of the wavefront manipulator and the output-coupling hologram of a HoloCam in a top view.

FIG. 11 shows two variants for relative dimensioning of the input-coupling hologram and thus also of the wavefront manipulator used and the output-coupling hologram of a HoloCam in a top view. In the variant shown on the left in FIG. 11, only one camera 5 and a correspondingly small output-coupling hologram 3 are provided. In this variant, starting from an input-coupling hologram 2 or 2A or 25 extending over almost the entire width of the waveguide 1 is required via the waveguide 1 for focusing the waves or rays onto the output-coupling hologram 3. In this variant, a correspondingly large-area wavefront manipulator 13 according to the invention is required for focusing. The desired cubic phase functions can be generated in this case by dividing the overall field into a plurality of channels or, if necessary, by using a further switchable component upstream of the camera. The switchable component can in particular be switchable in a time-sequential manner, wherein for example a wide field of view can be covered by sequential switching despite the presence of only one camera.

In the variant shown on the right in FIG. 11, a plurality of cameras 5 and an output-coupling hologram 3 covering almost the entire width of the waveguide 1 are provided. In this variant, only a small input-coupling hologram 2 is required, by means of which the waves or rays to be detected must be defocused onto the output-coupling hologram 3. A small wavefront manipulator 13 according to the invention is able to be used for this purpose.

Figure 12:
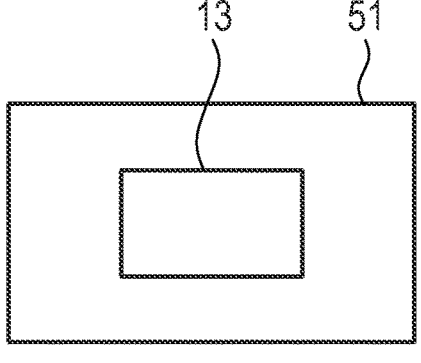
FIG. 12 schematically shows an optical device.

FIG. 12 schematically shows an optical device 51 according to the invention, which comprises a wavefront manipulator 13 according to the invention. The optical device 51 can be, for example, a waveguide or an objective lens or a camera or an optical observation device or a display apparatus, in particular a camera for a cell phone and/or a microscope camera or smartglasses or a projector or a head-up display or a display apparatus designed for a microscope.

Figure 13:
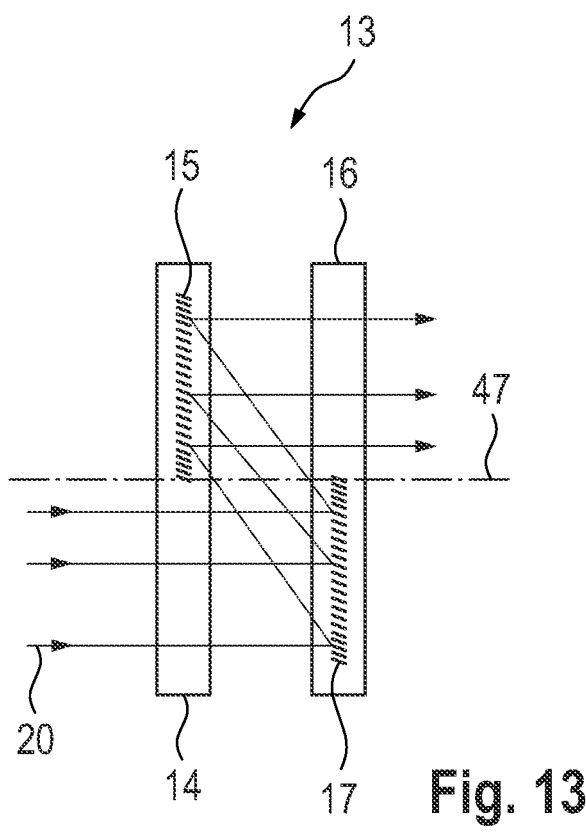
FIG. 13 schematically shows a reflective variant of a wavefront manipulator.

In the variants shown and described so far, the waves to be manipulated are transmitted through the diffractive optical components used. FIG. 13 schematically shows a reflective configuration variant of a wavefront manipulator 13 according to the invention, which represents an additional or alternative option for all configuration variants described above. In the variant shown in FIG. 13, the incident waves 20, in particular light waves, are first reflected by the hologram 17 of the second diffractive optical component 16 in the direction of the first diffractive optical component 14 and are then reflected by the hologram 15 of the first diffractive optical component 14. In the variant shown, before the waves are reflected at the hologram 17 of the second diffractive optical component 16, they are transmitted through the first optical component 14, and after the waves have been reflected at the hologram 15 of the first diffractive optical component 14, they are transmitted through the second optical component 16. As an alternative, the optical components 14 and 16 can also be arranged with a lateral displacement with respect to one another in a way such that only reflection but no transmission takes place.

Figure 14:
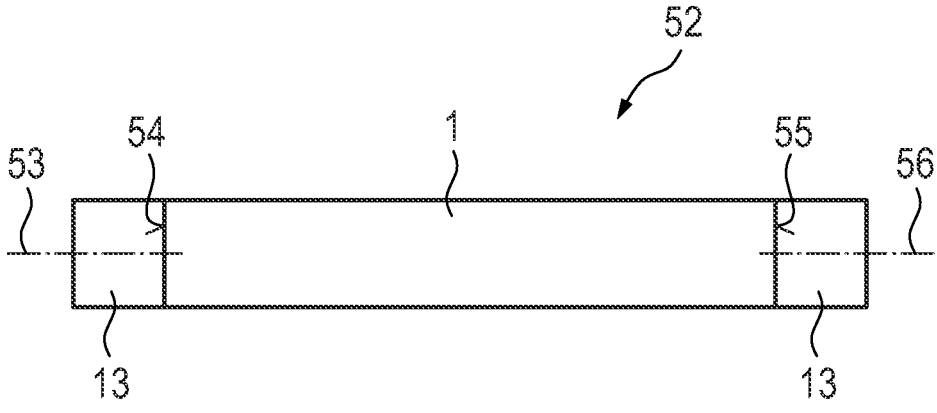
FIG. 14 schematically shows a waveguide arrangement.

FIG. 14 schematically shows a waveguide arrangement 52 according to the invention in a general form. The waveguide arrangement 52 comprises a waveguide 1, for example a light guide, with an entrance 54 for coupling waves, for example light waves, into the waveguide 1 and an exit 55 for coupling waves, for example light waves, out of the waveguide 1. The optical axis at the entrance 54 is denoted by reference sign 53, the optical axis at the exit 55 is denoted by reference sign 56.

A wavefront manipulator 13 according to the invention described above is arranged at the entrance 54 as an input coupling element and is designed to manipulate, for example to focus or defocus, waves to be coupled into the waveguide. In addition or alternatively, a described wavefront manipulator 13 according to the invention can be arranged at the exit 55 as an output coupling element and designed to manipulate, for example to focus or defocus, waves to be coupled out of the waveguide. The optical axis of a wavefront manipulator 13 arranged at the entrance 54 is preferably identical to the optical axis 53 at the entrance 54 or runs parallel thereto, and/or the optical axis of a wavefront manipulator 13 arranged at the exit 55 is identical to the optical axis 56 at the exit 55 or runs parallel thereto.

In an advantageous variant, one of the diffractive optical components of the wavefront manipulator 13, in particular one of the diffractive structures, can be an integral part of the waveguide 1 or be integrated therein, for example be arranged inside the waveguide 1. Examples of this are also shown in FIGS. 5 and 6.

LIST OF REFERENCE SIGNS

1 Waveguide
2 Input coupling hologram
3 Output coupling hologram
4 Objective lens
5 Camera/Sensor
6 Focus (fixed)
7 Focus 1
8 Focus 2
9 Focus 3 (collimated)
10 Refractive focus system
11 Alvarez element 1
11A Free-form surface 1
12 Alvarez element 2
12A Free-form surface 2
13 Diffractive focus system/wavefront manipulator
14 Substrate 1
15 Hologram 1
16 Substrate 2
17 Hologram 2
18 Line pitch
19 Substrate 3
20 Collimated beam path
21 Divergent beam path
22 Convergent beam path
23 One-dimensional convergent beam
24 Switchable DOE/HOE/phase plate focusing
25 Switchable DOE/HOE/phase plate coupling
26 HoloCam
27 Diffractive structure elements
28 Center/center line/mirror axis
29 Beam path
30 Housing/clamping
31 Direction of wave propagation
32 Direction of wave propagation
33 Focal length
34 Lateral displacement
35 Movement in the y-direction
36 Movement in the x-direction
37 Movement in the x- and y-directions
38 Hologram
39 Hologram
40 Focal plane
41 Optical axis
42 Optical axis
43 Surface
44 Surface
45 Cartesian coordinate system
46 Optical axis
47 Optical axis
48 Axial focus displacement
49 Transverse focus displacement
50 Circuit
51 Optical device
52 Waveguide arrangement
53 Optical axis
54 Entrance
55 Exit
56 Optical axis
$\lambda_1$ Design wavelength
$\lambda_2$ Wavelength≠design wavelength

The invention claimed is:

1. A wavefront manipulator defining an optical axis along which light propagates through the wavefront manipulator, the wavefront manipulator comprising:

at least two diffractive optical components, which are arranged one behind the other along the optical axis, each of which comprising a diffractive structure having a plurality of diffractive holographic structure elements, wherein the wavefront manipulator can vary a light wavefront via the diffractive structures of the at least two diffractive optical components between at least two states that deviate from one another, and at least one device for acoustically varying the state of the light wavefront.

2. The wavefront manipulator of claim 1, wherein the wavefront manipulator can vary the light wavefront between discrete states or continuously via the diffractive structures of the at least two diffractive optical components.

3. The wavefront manipulator of claim 1, wherein the wavefront manipulator further comprises at least one device for mechanically varying the state of the light wavefront.

4. The wavefront manipulator of claim 1, further comprising a first diffractive optical component and a second diffractive optical component, wherein the first diffractive optical component and the second diffractive optical component are arranged so as to be movable relative to one another in a plane perpendicular to the optical axis.

5. The wavefront manipulator of claim 4, wherein the first diffractive optical component and the second diffractive optical component are each arranged so as to be laterally displaceable with respect to one another in a plane perpendicular to the optical axis and/or rotatable about an axis arranged parallel to the optical axis.

6. The wavefront manipulator of claim 1, wherein the diffractive structure of at least one of the diffractive optical components is variable with regard to its diffractive properties by changing a voltage applied to the diffractive optical component or by changing a current intensity flowing through the diffractive optical component.

7. The wavefront manipulator of claim 1, wherein the diffractive structure of at least one of the diffractive optical components comprises a center and the distances between each of the plurality of diffractive holographic structure elements decreases or increases as the distance from the center increases in the lateral direction.

8. The wavefront manipulator of claim 1, wherein the distance and/or the orientation of adjacent diffractive holographic structure elements is described by a polynomial in dependence on the distance from a center of the diffractive structure.

9. The wavefront manipulator of claim 1, wherein the plurality of diffractive holographic structure elements comprise elevations or depressions or discolorations or chemical material changes.

10. The wavefront manipulator of claim 1, wherein the plurality of diffractive holographic structure elements of at least one of the diffractive optical components comprise regions which are spatially adjacent to one another in the transverse direction and have refractive indices that deviate from one another.

11. The wavefront manipulator of claim 10, wherein at least one of the plurality of diffractive holographic diffractive structures has a variable refractive index distribution.

12. The wavefront manipulator of claim 11, wherein the refractive index difference increases or decreases as the distance of the region from a center of the diffractive structure increases.

13. The wavefront manipulator of claim 1, wherein at least one of the diffractive structures comprises a volume hologram and/or a surface hologram and/or an amplitude hologram and/or a phase hologram and/or a transmission hologram and/or a white light hologram and/or a hologram that can be reconstructed under white light and/or a true-color hologram.

14. The wavefront manipulator of claim 1, wherein at least one of the diffractive optical components comprises a plate or sheet or film.

15. The wavefront manipulator of claim 1, wherein the wavefront manipulator comprises four diffractive optical components, wherein a first and a second of the diffractive optical components are arranged immediately adjacent to one another and are displaceable with respect to one another in a first lateral direction, and wherein a third and a fourth of the diffractive optical components are arranged immediately adjacent to one another and are displaceable with respect to one another in a second lateral direction.

16. The wavefront manipulator of claim 1, wherein the wavefront manipulator comprises three diffractive optical components, wherein a third of the diffractive optical components is arranged in the direction of the optical axis between a first and a second of the diffractive optical components.

17. A waveguide arrangement comprising at least one waveguide and at least one wavefront manipulator according to claim 1, wherein the wavefront manipulator is operatively connected to the waveguide.

18. The waveguide arrangement of claim 17, wherein the at least one wavefront manipulator is an input coupling element and/or an output coupling element in relation to the waveguide and/or the at least one wavefront manipulator is at least partially integrated into the waveguide.

19. An optical device comprising the wavefront manipulator of claim 1 and/or the waveguide arrangement of claim 17.

20. The optical device of claim 19, wherein the optical device is a waveguide or an objective lens or a camera or an optical observation device or a display apparatus.

21. The optical device of claim 20, wherein, when the optical device is a camera, the camera is a holographic camera and/or a camera for a cell phone and/or a microscope camera, when optical device is a display apparatus, the display apparatus is a pair of smartglasses or a projector or a head-up display or a microscope.

22. A method of using at least one wavefront manipulator and/or the waveguide arrangement as provided in claim 17, comprising focusing light wavefronts via the at least one wavefront manipulator and/or the waveguide arrangement.

23. A wavefront manipulator defining an optical axis along which light propagates through the wavefront manipulator, the wavefront manipulator comprising:

at least two diffractive optical components, which are arranged one behind the other along the optical axis, each of which comprising a diffractive structure having a plurality of diffractive holographic structure elements, wherein the wavefront manipulator can vary a wavefront via the diffractive structures of the at least two diffractive optical components between at least two states that deviate from one another, and at least one device for electrically varying the state of the wavefront, wherein the first diffractive optical component and the second diffractive optical component are each arranged so as to be rotatable about an axis arranged parallel to the optical axis.

24. A wavefront manipulator defining an optical axis along which light propagates through the wavefront manipulator, the wavefront manipulator comprising:

at least two diffractive optical components, which are arranged one behind the other along the optical axis, each of which comprising a diffractive structure having a plurality of diffractive holographic structure elements, wherein the wavefront manipulator can vary a wavefront via the diffractive structures of the at least two diffractive optical components between at least two states that deviate from one another, and at least one device for electrically varying the state of the wavefront, wherein the diffractive structure of at least one of the diffractive optical components is variable with regard to its diffractive properties by changing a voltage applied to the diffractive optical component or by changing a current intensity flowing through the diffractive optical component.

* * * * *